United States Patent [19]

Ziliani et al.

[11] Patent Number: 4,986,301

[45] Date of Patent: Jan. 22, 1991

[54] SUB-SEA VALVE ACTUATOR

[75] Inventors: Rino Ziliani, Piacenza; Giuseppe Ziveri; Ferruccio Pellinghelli, both of Parma, all of Italy

[73] Assignee: Biffi Italia S.r.l., Italy

[21] Appl. No.: 482,211

[22] Filed: Feb. 20, 1990

[51] Int. Cl.⁵ .................... F16K 43/00; F16K 51/00
[52] U.S. Cl. ........................ 137/315; 74/29; 74/89.17; 92/136; 251/58; 251/229; 251/250; 251/292
[58] Field of Search ............... 137/315, 454.2, 454.6; 92/136; 251/58, 229, 230, 250, 291, 292; 74/29, 30, 89.17, 109

[56] References Cited

U.S. PATENT DOCUMENTS

| | | | |
|---|---|---|---|
| 3,032,016 | 5/1962 | Smith | 251/58 |
| 3,056,573 | 10/1962 | Matheson et al. | 251/58 |
| 3,204,920 | 9/1965 | Generke | 251/58 |
| 3,213,758 | 10/1965 | Workman | 92/136 |
| 3,218,024 | 11/1965 | Kroekel | 251/58 |
| 3,338,140 | 8/1967 | Sheesley | 251/58 |
| 4,084,786 | 4/1978 | Walters | 251/250 |
| 4,387,735 | 6/1983 | Ripert | 137/315 |
| 4,431,022 | 2/1984 | Ripert | 137/315 |
| 4,727,901 | 3/1988 | Horvei | 137/315 |

Primary Examiner—George L. Walton
Attorney, Agent, or Firm—Laff, Whitesel, Conte & Saret

[57] ABSTRACT

The coupling between a sub-sea pipeline valve and its actuator is brought about by the adoption of a device (4) associated rigidly with the housing of the valve and provided with a hollow shaft (6) into which the valve shaft is keyed. The top of the hollow shaft affords a ring of dogs (7) designed to engage matching dogs (8) carried by a sleeve (9) driven by the pistons of the hydraulic actuator through a mechanical linkage, so that the movement which opens and closes the valve is transmitted through an easily coupled and decoupled dog-clutch; the stationary part of the device (4) is provided with torque reaction lugs (20, 21) which occupy sockets (22) formed in the casing of the actuator.

4 Claims, 5 Drawing Sheets

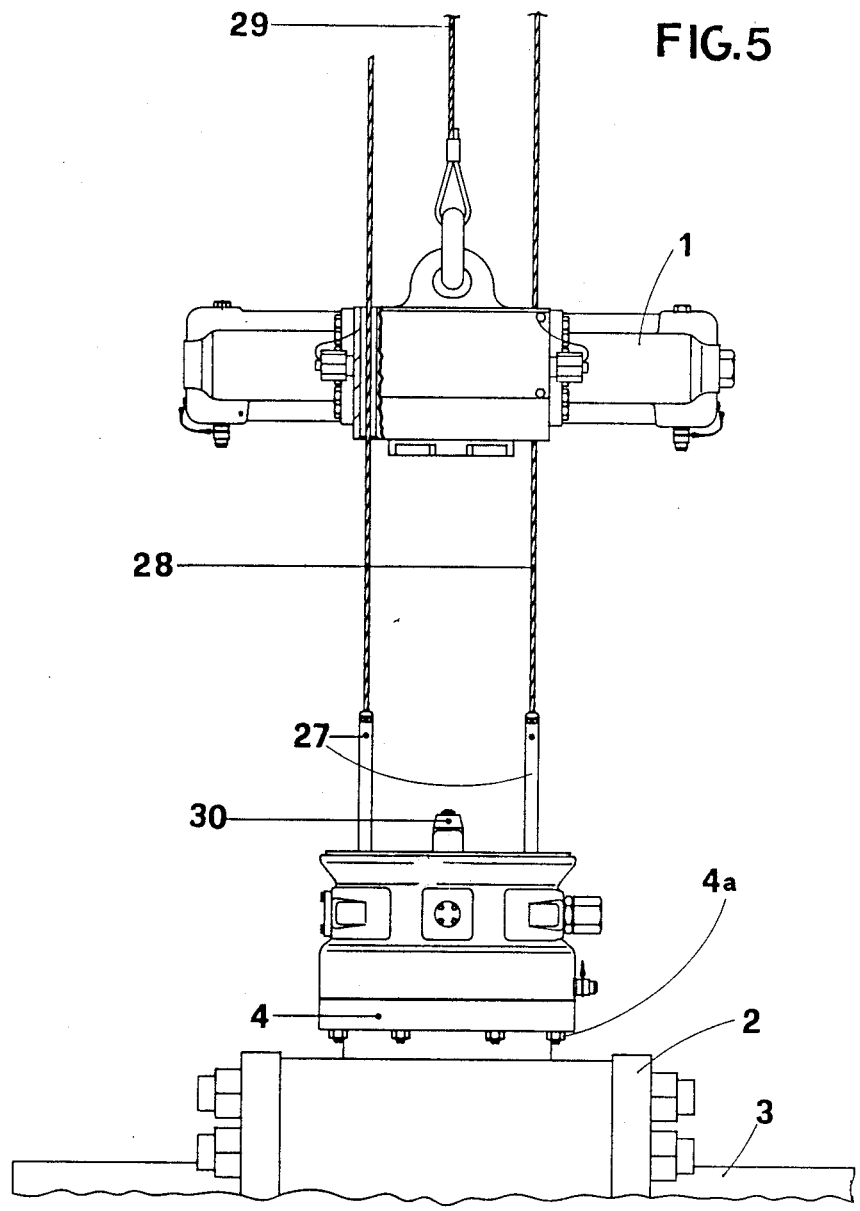

4,986,301

SUB-SEA VALVE ACTUATOR

BACKGROUND OF THE INVENTION

The present invention relates to an actuator for sub-sea valves.

Valve assemblies in sea-bed pipeline installations comprise a valve housing proper, generally with a ball element, and a separate actuator, that is, a directly or remotely controlled device by which the valve is opened and closed.

Conventional actuator systems are mostly hydraulic, comprising a hydraulic pump and a control circuit by which oil is forced into a chamber accommodating a piston; the piston operates a rack-and-gear drive of which the gear is keyed to a shaft, this shaft being coupled in turn to the shaft of the valve. Such actuators require periodic maintenance, which must be effected out of water, and therefore have to be removed from the pipeline at given intervals. Accordingly, the coupling between the shafts of the actuator and the valve must be such as to enable swift removal of the actuator, not least in the event of malfunction or breakdown occurring.

The conventional systems used currently to couple actuators and valves are notably time-consuming, in particular when connecting the components together; these are underwater operations repeated many times over and at considerable depth, where, as is well known, the ability of a person to operate at full physical and mental capacity is notably impaired. More exactly, the conventional systems in question involve coupling the shaft of the actuator to the keyed shaft of the valve; to facilitate alignment of the two parts, use is made of frames, bolted to the valves, by which the actuator is guided onto the valve shaft until fully home.

With the coupling effected, a plurality of bolts must be tightened to clamp together two flanges associated respectively with the actuator and the valve. This tightening operation requires a certain expenditure of physical energy on the part of the diver, besides taking time to complete; both are factors contributing ultimately to produce a high maintenance cost per actuator.

The object of the present invention is to bring about a notable reduction in the amount of time required to fit and remove sub-sea actuators, and to facilitate the task of the diver considerably by eliminating the need for energy-sapping maneuvers and decisions or calculations, the difficulty of which increases at depth.

A further object of the invention is to enable a simple diagnosis of the working efficiency of the actuator or the valve without the need to detach the one from the other.

SUMMARY OF THE INVENTION

The stated objects, and others besides, are fully realized in the sub-sea valve actuator disclosed, of which the essential feature is that it comprises a coupling device located between the valve and the actuator, rigidly associated with the valve and affording an internally slotted hollow shaft in which the shaft of the valve is stably insertable. The hollow shaft of the coupling device affords a plurality of dogs that engage with matching dogs offered by an axially slidable sleeve, the sleeve itself being spring-loaded such that its dogs are urged constantly against those of the hollow shaft to ensure a permanent coupling between sleeve and shaft. The sleeve is keyed to a gear in mesh with two racks driven by respective hydraulic pistons.

BRIEF DESCRIPTION OF THE DRAWINGS

The invention will now be described in detail, by way of example, with the aid of the accompanying drawings, in which:

FIG. 5 illustrates the manner of assembling the actuator and the coupling device.

DESCRIPTION OF THE PREFERRED EMBODIMENTS

As discernible from FIG. 5, the actuator according to the invention appears as a packaged unit, denoted 1 in its entirety, incorporating all such manually or remotely controlled media as serve to operate a valve 2 installed along a pipeline 3. In the same drawing, 4 denotes a coupling device flange-mounted to the valve 2 and secured with a plurality of bolts 4a.

Figure 1:
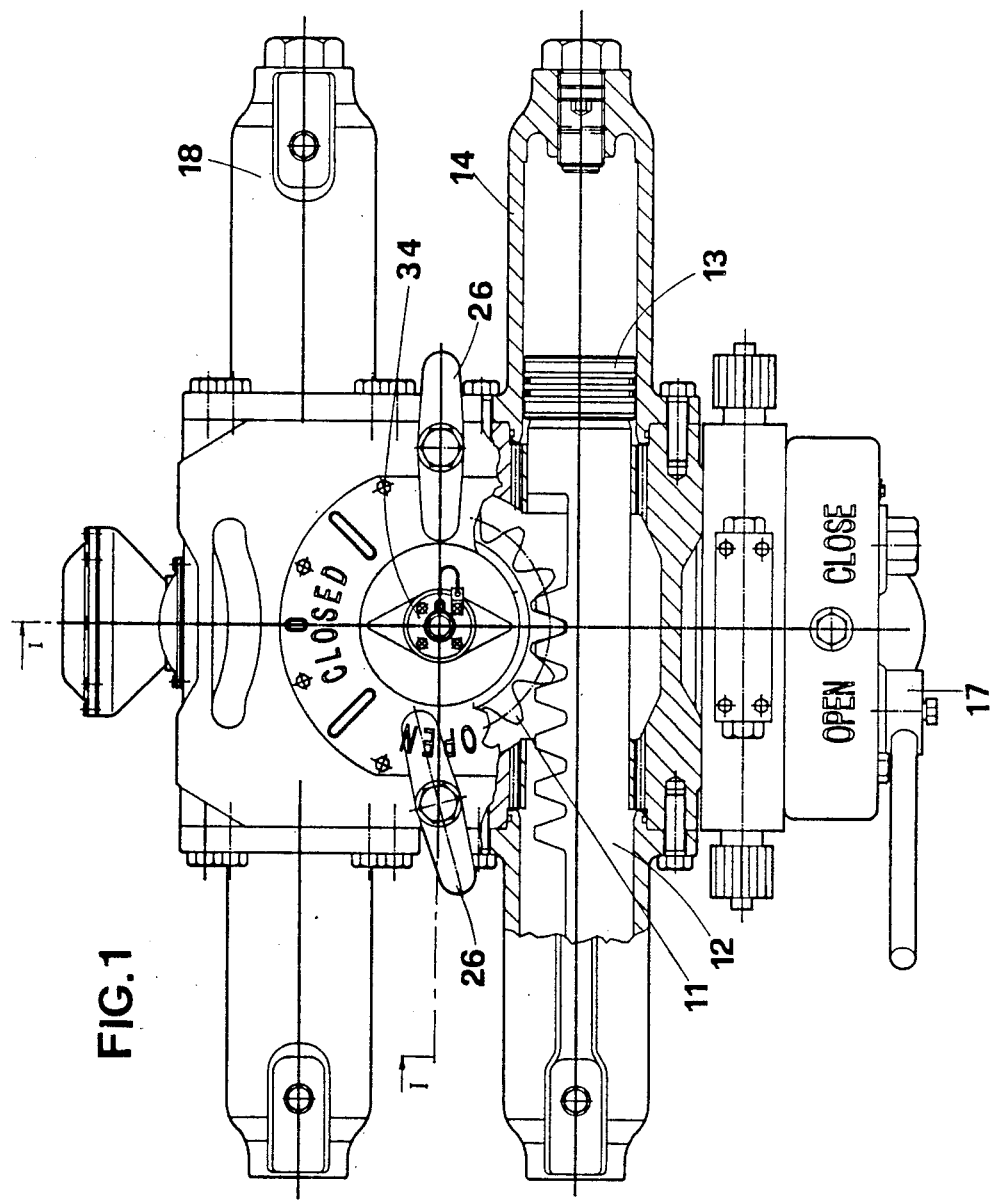
FIG. 1 illustrates the actuator in plan, and partly in cutaway to reveal certain details.
Figure 2:
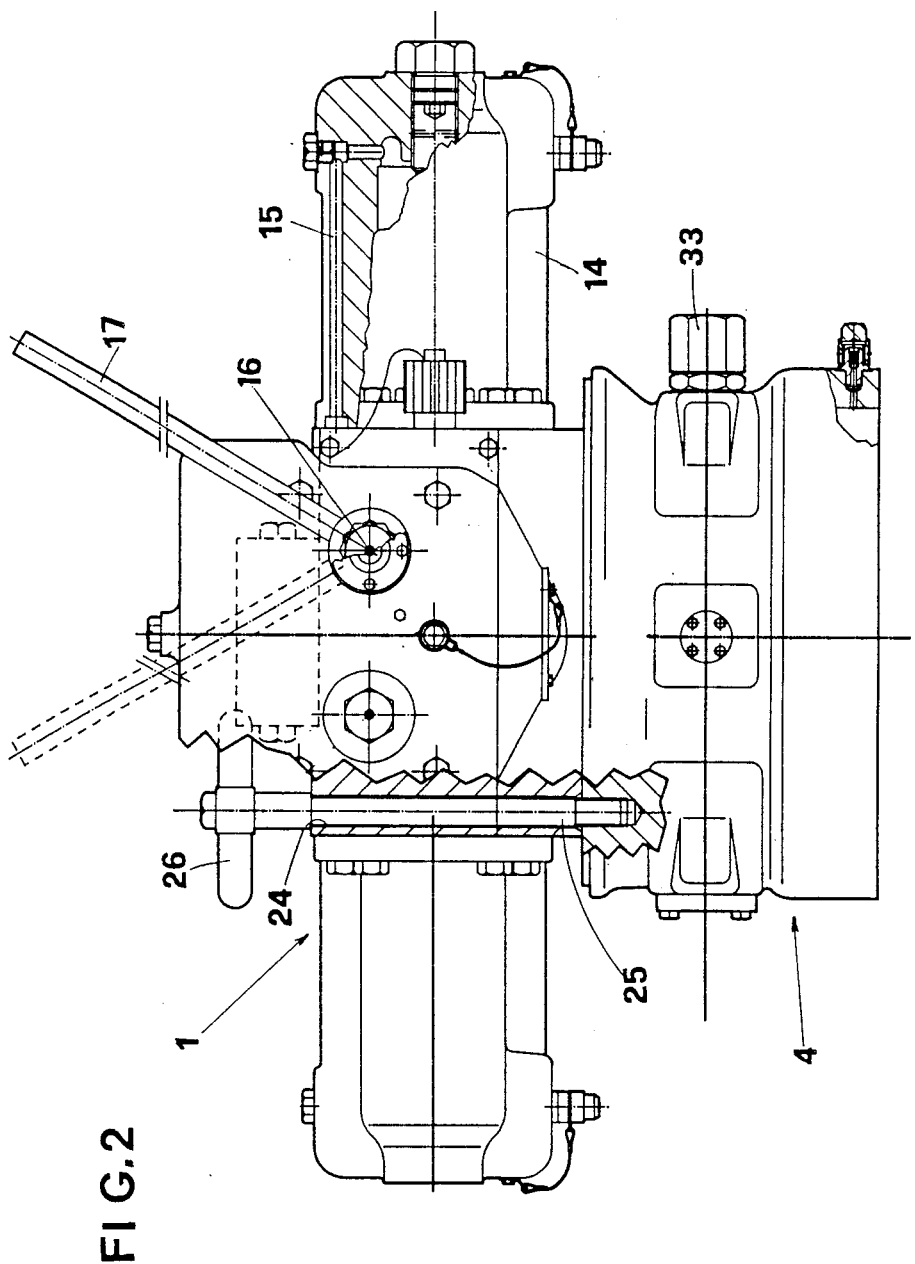
FIG. 2 shows a frontal elevation of the actuator, likewise cut away in part.
Figure 3:
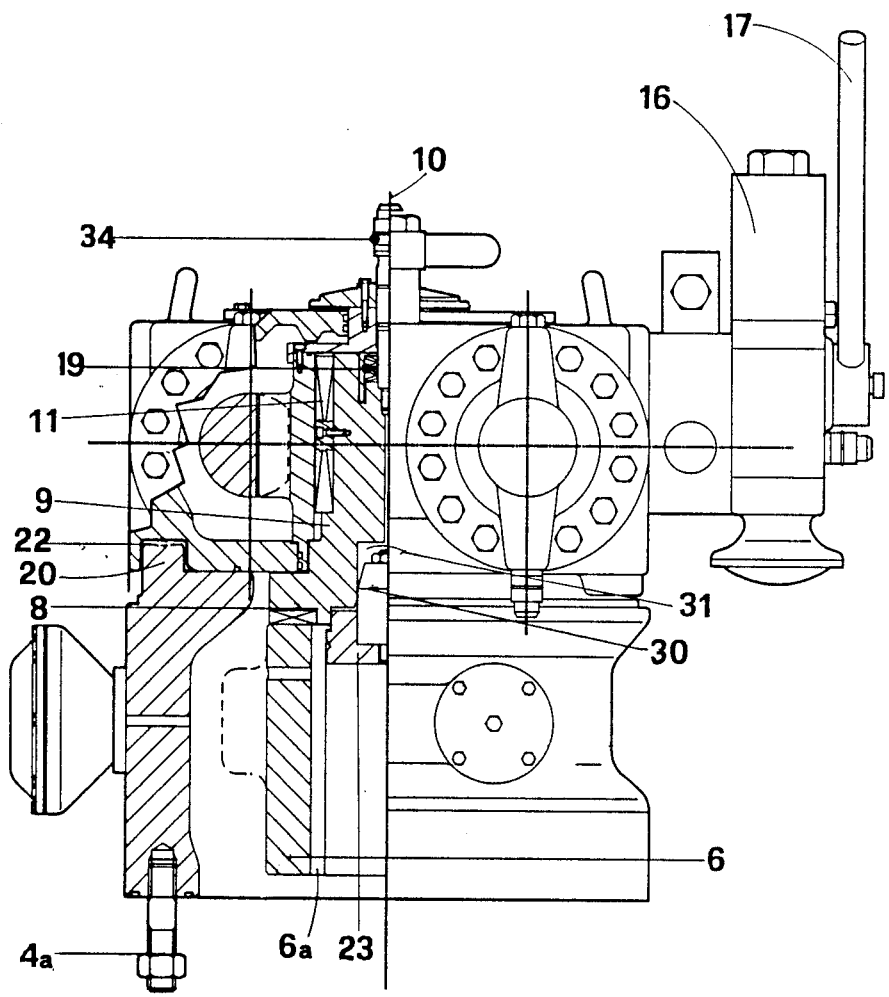
FIG. 3 is the side elevation of I-I in FIG. 1.
Figure 4:
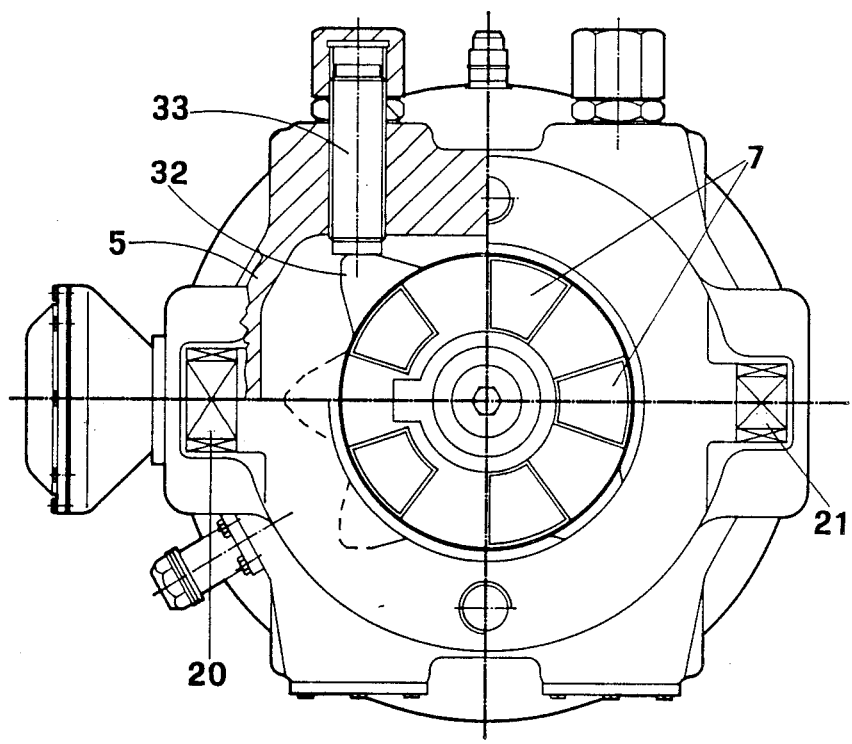
FIG. 4 shows the coupling device from above, cut away in part to reveal certain details.

Referring to FIGS. 2, 3 and 4, the coupling device 4 comprises a substantially cylindrical casing 5 accommodating a hollow shaft 6 with a keyway 6a, into which the shaft of the valve (not illustrated, being conventional) is insertable.

The shaft 6 is provided uppermost with a plurality of dogs 7 arranged equidistantly around a given circumference and designed to engage positively with a corresponding plurality of dogs 8 afforded by a sleeve 9 located inside the actuator, which is both rotatable about and capable of movement along its own longitudinal axis 10.

11 denotes a gear keyed to the sleeve 9, offered in meshing contact to a rack 12 invested with linear movement by the floating piston 13 of a hydraulic cylinder 14.

It is this hydraulic cylinder 14 which produces the opening movement of the valve, the necessary fluid being supplied through a duct 15 fashioned in the relative barrel and connecting with a hand pump 16 operated by a lever denoted 17.

The same gear 11 also meshes with the rack of a second cylinder 18, likewise serving to open or close the valve.

The sleeve 9 is biased elastically against the hollow shaft 6 by belleville discs 19 in such a way that the sets of dogs 7 and 8 will remain engaged. The coupler is provided with two projections 20 and 21 designed to locate in respective sockets 22 in the casing of the actuator (one such socket 22 only is visible in FIG. 3); these projections 20 and 21 serve to lock the actuator and coupler casings one to the other to enable the transmission of torque, and are of dissimilar section in order to allow one mounting position only.

30 denotes a pilot pin rigidly associated with a ring 23, rigidly associated in its turn with the hollow shaft 6, which is insertable in a socket 31 offered by the sleeve 9 and thus provides a guide for alignment of the actuator with the coupler. The casing of the actuator affords two through holes 24 (one only visible in FIG. 2), serving to accommodate two stud bolts 25 which pass through completely to engage threads in the casing of the coupler and are tensioned by relative wing nuts 26, thereby clamping the actuator to the coupler. These same holes 24 which accommodate the studs 25 can be used to advantage (as shown in FIG. 5) for the purposes of refitting an actuator following repairs or overhaul, i.e. to a valve 2 in situ. The operation would be accomplished using two guide rods 27, each attached to the end of one of a pair of ropes 28 threaded through the two holes 24 and tautened from a craft on the surface, in such a way that the actuator can be guided down to the work location, its weight taken by the rope 29 of the craft's lifting gear.

Adopting this method of lowering the actuator, the coupling operation can be brought about swiftly and without intervention from the diver, who needs only to detach the ropes and fit the two wing nuts. In the event, with the casings clamped up, that the dogs fail to engage as a result of being rotated out of alignment with one another, this will be corrected automatically as soon as the actuator is operated to open or close the valve; once aligned, in fact, the dogs will clutch and remain engaged through the agency of the belleville discs. The hollow shaft 6 carries a stop 32 designed to enter into contact with a setscrew denoted 33, serving to limit the degree of rotation allowed to the valve shaft, of which the position is selected prior to submersion of the coupler.

A successful connection between the actuator and the coupler is achieved regardless of the relative positions of the two sets of dogs. Moreover, by providing the coupler with the stop 32 and limiter screw 33, it becomes possible to fit one actuator to different valves, or to replace one actuator with another, without making any stroke adjustment. Adopting an arrangement according to the invention, not only is there the advantage that the actuator can be fitted to the coupler without difficulty on the part of the diver, but also, that operation of the actuator and the valve can be verified without disturbing the installation.

Using a special tool, in fact, the sleeve and the hollow shaft can be decoupled by compressing the belleville discs, whereupon the actuator can be rotated without causing the valve to rotate, and the position of the dogs inspected by reference to a suitable visual indicator 34.

What is claimed:
1. A sub-sea valve assembly including:
   hydraulic means (14) operated independently by a hydraulic pump and serving to produce the opening or closing movement of said valve (2),
   said valve having shaft means for actuating said valve,
   a coupling device (4) rigidly associated with said valve and affording a hollow shaft (6) in which said shaft of said valve is stably and cooperatively insertable;
   a first plurality of dogs (7) associated with said hollow shaft (6) of the coupling device, and a second plurality of dogs (8) associated with spring-loaded sleeve means (9) mounted on said hydraulic means, which are designed to engage initially one with the other and remain thus engaged by virtue of the spring-loaded action of said sleeve (9), said coupling device (4) includes two projections (20,21) of dissimilar section, said hydraulic means including a casing having a pair of dissimilar sockets complimentary to said projections, whereby said projections are limited in their insertability in said complimentary sockets (22) provided by said casing to insure positive and proper orientation and providing a reaction to enable a positive transmission of torque between said hydraulic means and said coupling device.

2. A sub-sea valve assembly as claimed in claim 1, wherein said hydraulic means including a casing having two through holes (24) designed to accept two studs (25), each said stud having one end screw threaded and screwed into a complimentary threaded bore in said casing of said coupling device at said one end and tightened with threaded securing nuts (26) bearing against said hydraulic means and mounted on said studs at their opposite end.

3. A system for replaceable actuation means for sub-sea valve assemblies, including:
   a shaft operatable valve means interposed in the stream of a pipeline and capable of opening and closing the flow through said pipeline;
   coupling means rigidly associated with said valve means and affording complimentary shaft means, at one end of which shaft means said valve shaft is readily joined; said complimentary shaft means at its opposite end including a fire plurality of dogs for transmission of torque,
   hydraulic actuating means including a rotary actuatable axially spring-loaded sleeve means having a second plurality of complimentary dogs designed to engage said first plurality of dogs and be maintained in engaged relation by virtue of said spring-loaded action of said sleeve means,
   said coupling means and said hydraulic actuating means further including dissimilar projections and sockets positioned on opposite sides thereof to insure proper positioning of said coupling means and said hydraulic actuating means relative to each other,
   said hydraulic actuating means including at least two through bores aligned with matching threaded bores in said coupling means and adapted to accept an elongated generally axially extending locating means for facilitating guided juxtaposition of said hydraulic actuating means with said coupling means, whereby upon removal of said locating means from said bores permits the introduction of threaded fastening means into said bores to securely join said hydraulical actuating means and said coupling means in said properly oriented juxtaposition.

4. A system for sub-sea valve assemblies as claimed in claim 3 wherein said elongated locating means is a rod means threaded at one end and having elongated cable means extending from the opposite end of said rod means with said cable means adapted to be telescoped through said through bores in said actuating means to provide guide means for replacement actuating means to be directed from a remote position into exact position relative to said coupling means, whereby said cooperating projections and sockets will be mated and said rod means can be readily replaced by standard threaded members to insure positive assembly of said actuating means and said coupling means.

* * * * *